United States Patent
Zhu et al.

(10) Patent No.: US 9,216,737 B1
(45) Date of Patent: Dec. 22, 2015

(54) SYSTEM AND METHOD FOR AUTOMATICALLY DETECTING KEY BEHAVIORS BY VEHICLES

(71) Applicant: Google Inc., Mountain View, CA (US)

(72) Inventors: Jiajun Zhu, Palo Alto, CA (US); David Ian Franklin Ferguson, San Francisco, CA (US); Dmitri A. Dolgov, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/570,321

(22) Filed: Dec. 15, 2014

Related U.S. Application Data

(63) Continuation of application No. 14/190,621, filed on Feb. 26, 2014, now Pat. No. 8,935,034, which is a continuation of application No. 13/446,518, filed on Apr. 13, 2012, now Pat. No. 8,700,251.

(51) Int. Cl.
  *G05D 1/02* (2006.01)
  *B60W 30/00* (2006.01)
  *G01C 21/34* (2006.01)

(52) U.S. Cl.
  CPC ............... *B60W 30/00* (2013.01); *G01C 21/34* (2013.01)

(58) Field of Classification Search
  USPC .......................................................... 701/25
  See application file for complete search history.

(56) References Cited

U.S. PATENT DOCUMENTS

| | | | | |
|---|---|---|---|---|
| 5,765,116 | A * | 6/1998 | Wilson-Jones et al. | 701/41 |
| 6,385,536 | B2 * | 5/2002 | Kimura | 701/446 |
| 6,385,539 | B1 * | 5/2002 | Wilson et al. | 701/468 |
| 6,526,352 | B1 * | 2/2003 | Breed et al. | 701/470 |
| 7,072,764 | B2 * | 7/2006 | Donath et al. | 701/532 |
| 7,124,027 | B1 * | 10/2006 | Ernst et al. | 701/301 |
| 7,510,038 | B2 * | 3/2009 | Kaufmann et al. | 180/169 |
| 8,428,820 | B2 * | 4/2013 | Ottenhues et al. | 701/41 |
| 2003/0191568 | A1 * | 10/2003 | Breed | 701/36 |
| 2004/0083037 | A1 * | 4/2004 | Yamane et al. | 701/1 |
| 2005/0015203 | A1 * | 1/2005 | Nishira | 701/301 |
| 2005/0149251 | A1 * | 7/2005 | Donath et al. | 701/200 |
| 2008/0177470 | A1 * | 7/2008 | Sutardja | 701/210 |
| 2009/0118994 | A1 * | 5/2009 | Mori et al. | 701/117 |
| 2009/0292468 | A1 * | 11/2009 | Wu et al. | 701/301 |
| 2010/0332127 | A1 * | 12/2010 | Imai et al. | 701/208 |

\* cited by examiner

*Primary Examiner* — Thomas Tarcza
*Assistant Examiner* — Alex C Dunn
(74) *Attorney, Agent, or Firm* — Lerner, David, Littenberg, Krumholz & Mentlik, LLP

(57) ABSTRACT

Aspects of the disclosure relate generally to detecting discrete actions by traveling vehicles. The features described improve the safety, use, driver experience, and performance of autonomously controlled vehicles by performing a behavior analysis on mobile objects in the vicinity of an autonomous vehicle. Specifically, an autonomous vehicle is capable of detecting and tracking nearby vehicles and is able to determine when these nearby vehicles have performed actions of interest by comparing their tracked movements with map data.

20 Claims, 10 Drawing Sheets

SYSTEM AND METHOD FOR AUTOMATICALLY DETECTING KEY BEHAVIORS BY VEHICLES

CROSS-REFERENCE TO RELATED APPLICATIONS

The present application is a continuation of U.S. patent application Ser. No. 14/190,621, filed on Feb. 26, 2014, which is a continuation of U.S. patent application Ser. No. 13/446, 518, filed on Apr. 13, 2012, now issued as U.S. Pat. No. 8,700,251, issued on Apr. 15, 2014, the disclosures of which are incorporated herein by reference.

BACKGROUND

Autonomous vehicles use various computing systems to aid in the transport passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

BRIEF SUMMARY

In various aspects, the disclosure provides a vehicle having a steering device (e.g., wheels that turn in the case of an automobile and a rudder in the case of a boat) and engine. The steering device may be controlled by a first user input controller (e.g., a steering wheel in the cockpit of a car), the engine may be controlled by a second user input controller (e.g., accelerator in the case of a car or a throttle in the case of boat), and both the engine and device may be controlled by a processor capable of executing computer instructions. The vehicle includes one or more sensors (e.g., cameras, radar, laser range finders) for capturing information relating to the environment in which the vehicle is operating. The processor receives data from the sensors and, based in part on data from the sensors or received from external sources or both, issues a navigation command, where the navigation command comprises a command to the steering device relating to the intended direction of the vehicle (e.g., a command to turn the front wheels of a car 10 degrees to the left) or to the engine relating to the intended velocity of the vehicle (e.g., a command to accelerate). Navigation commands may also include commands to brakes to slow the vehicle down, as well as other commands affecting the movement of the vehicle.

In one aspect, sensors are used to detect one or more nearby vehicles surrounding the autonomous vehicle, and data corresponding to these vehicles are sent to a processor. The processor analyzes the data corresponding to the nearby vehicles by comparing the data with map data containing numerous road graph elements. The processor may then associate the nearby vehicles with a specific road graph element, and determine when a nearby vehicle has performed an action of interest. The autonomously controlled vehicle may then alter its control strategy based on the occurrence of the action of interest. The road graph elements may include lanes of a roadway, and the action of interest may include a nearby vehicle changing from a first lane to a second lane.

In another aspect, altering the control strategy includes positioning the autonomous vehicle relative to the nearby vehicle in a predefined manner based on the occurrence of the action of interest. The control strategy may also be further altered based on actions of interest being performed by other nearby vehicles. The autonomous vehicle may also receive a request to navigate between a first location and a second location, where the control strategy includes having the autonomous vehicle travel along a path between the first and second locations.

In another aspect, the autonomous vehicle may filter data collected regarding the position and movement of nearby vehicles. In particular, the data may be filtered to only include instances where a nearby vehicle has performed an action of interest. As provided below, this determination is made by comparing data for the nearby vehicle with map data accessed by the autonomous vehicle.

DETAILED DESCRIPTION

Aspects of the disclosure relate generally to detecting instances when a vehicle has performed a discrete action of interest. In particular, a device implementing the disclosed system is capable of detecting surrounding vehicles using one or more sensors. The device may then determine when the surrounding vehicles have performed one of several predefined actions by comparing the sensor data with stored road graph data. The system described below may be implemented as part of autonomous driving vehicle. In turn, the autonomous vehicle may react to the behavior of nearby objects in a way that decreases the likelihood of an accident and increases the efficiency of travel.

Figure 1:
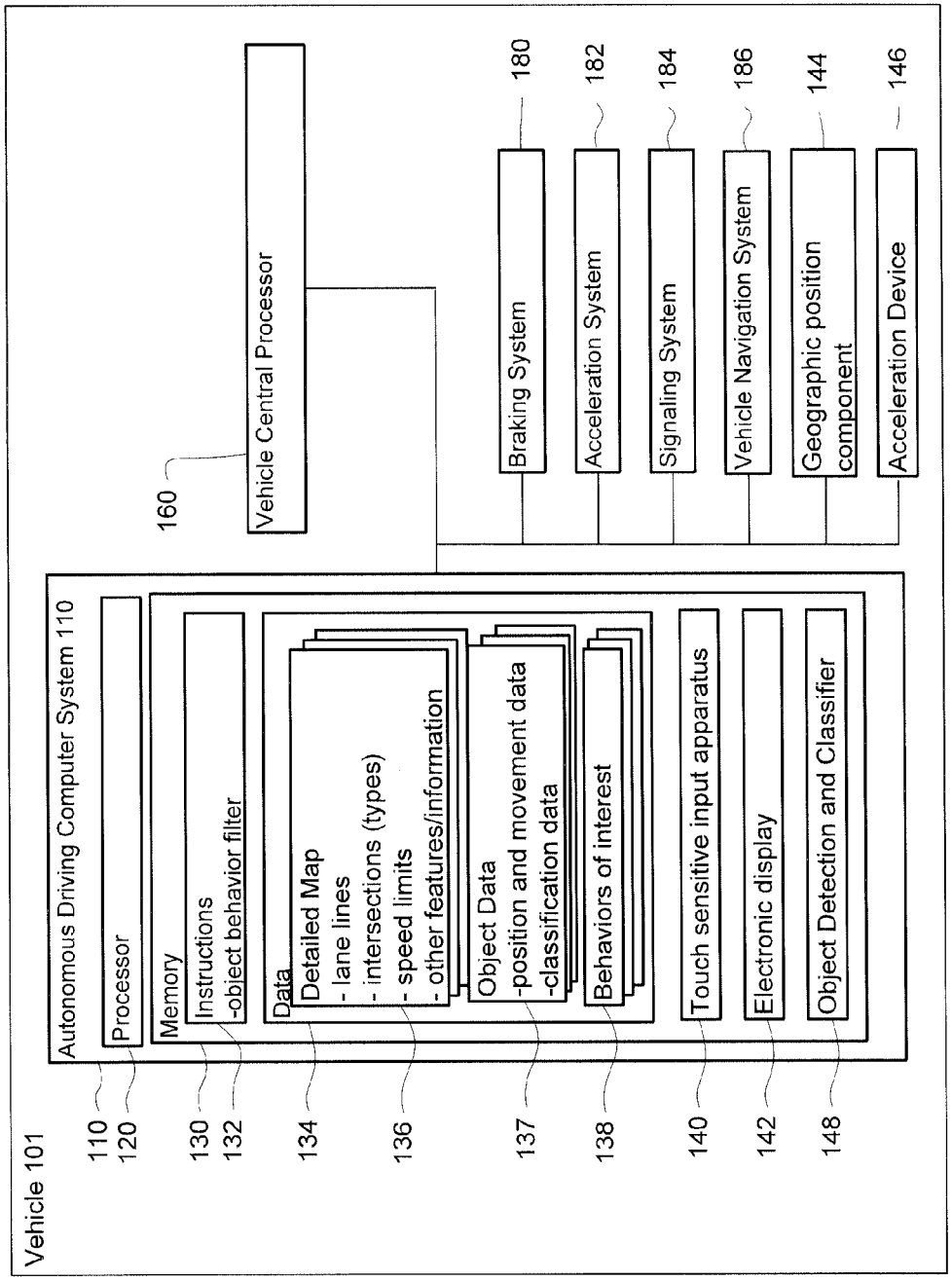
FIG. 1 is a functional diagram of an autonomous navigation system in accordance with an aspect of the disclosure.

As shown in FIG. 1, an autonomous driving system 100 in accordance with one aspect of the invention includes a vehicle 101 with various components. While certain aspects of the invention are particularly useful in connection with specific types of vehicles, the vehicle may be any type of vehicle including, but not limited to, cars, trucks, motorcycles, buses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPU's. Alternatively, the processor may be a dedicated device such as an ASIC or FPGA. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer, such as a central processing unit (CPU), memory 130 (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g., a video camera) for gathering explicit (e.g., a gesture) or implicit (e.g. "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 2:
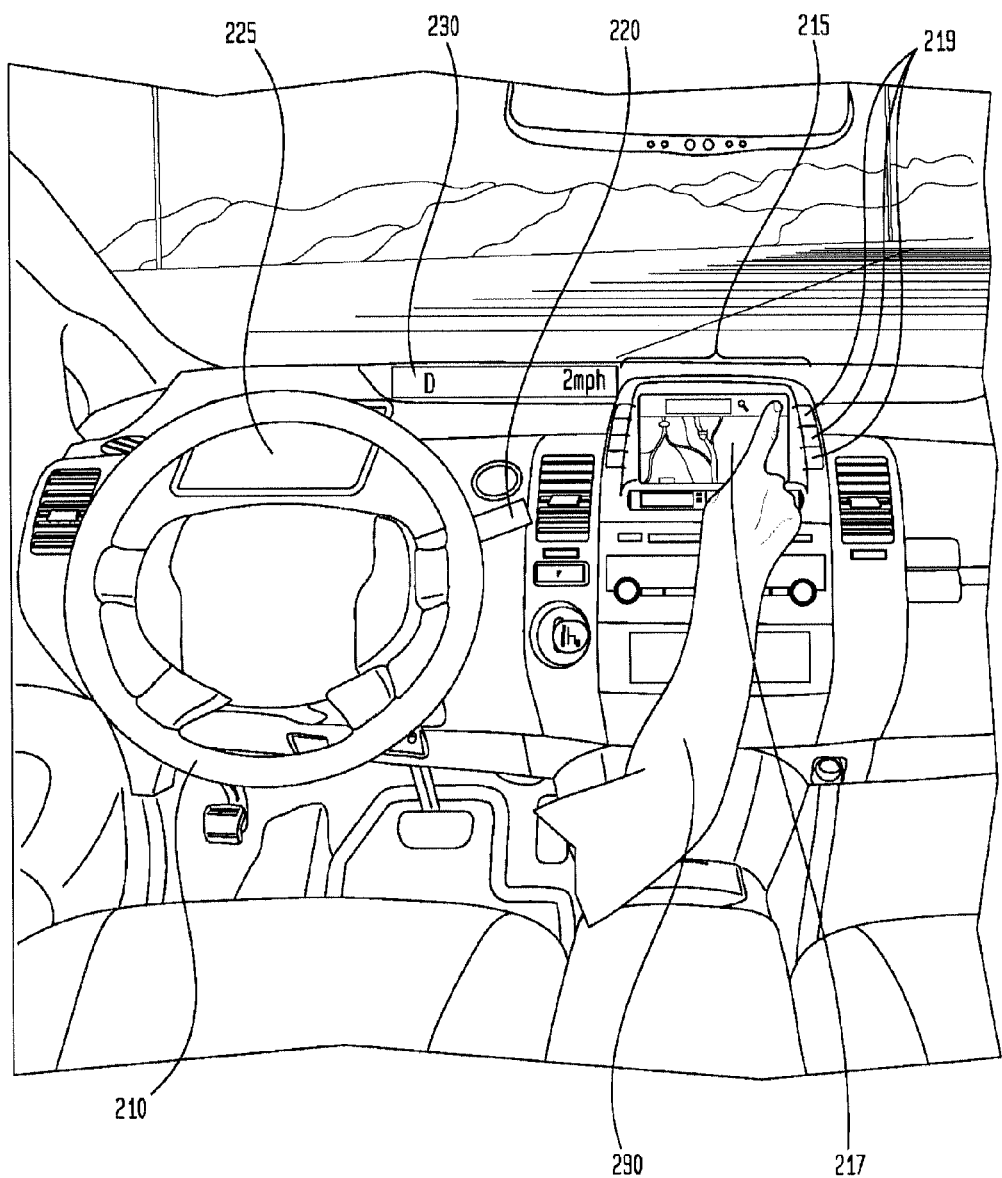
FIG. 2 is an exemplary design of the interior of an autonomous vehicle in accordance with an aspect of the disclosure.

As shown in FIG. 2, Vehicle 101 may be equipped with a display 225 for displaying information relating to the overall status of the vehicle, particular sensors, or computer 110 in particular. The display 225 may include computer generated images of the vehicle's surroundings including, for example, the status of the computer, the vehicle itself, roadways, intersections, as well as other objects and information.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. Returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220.

The vehicle may include components for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors allow the vehicle to understand and potentially respond to its environment in order to maximize safety for passengers as well as objects or people in the environment.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

Figure 3:
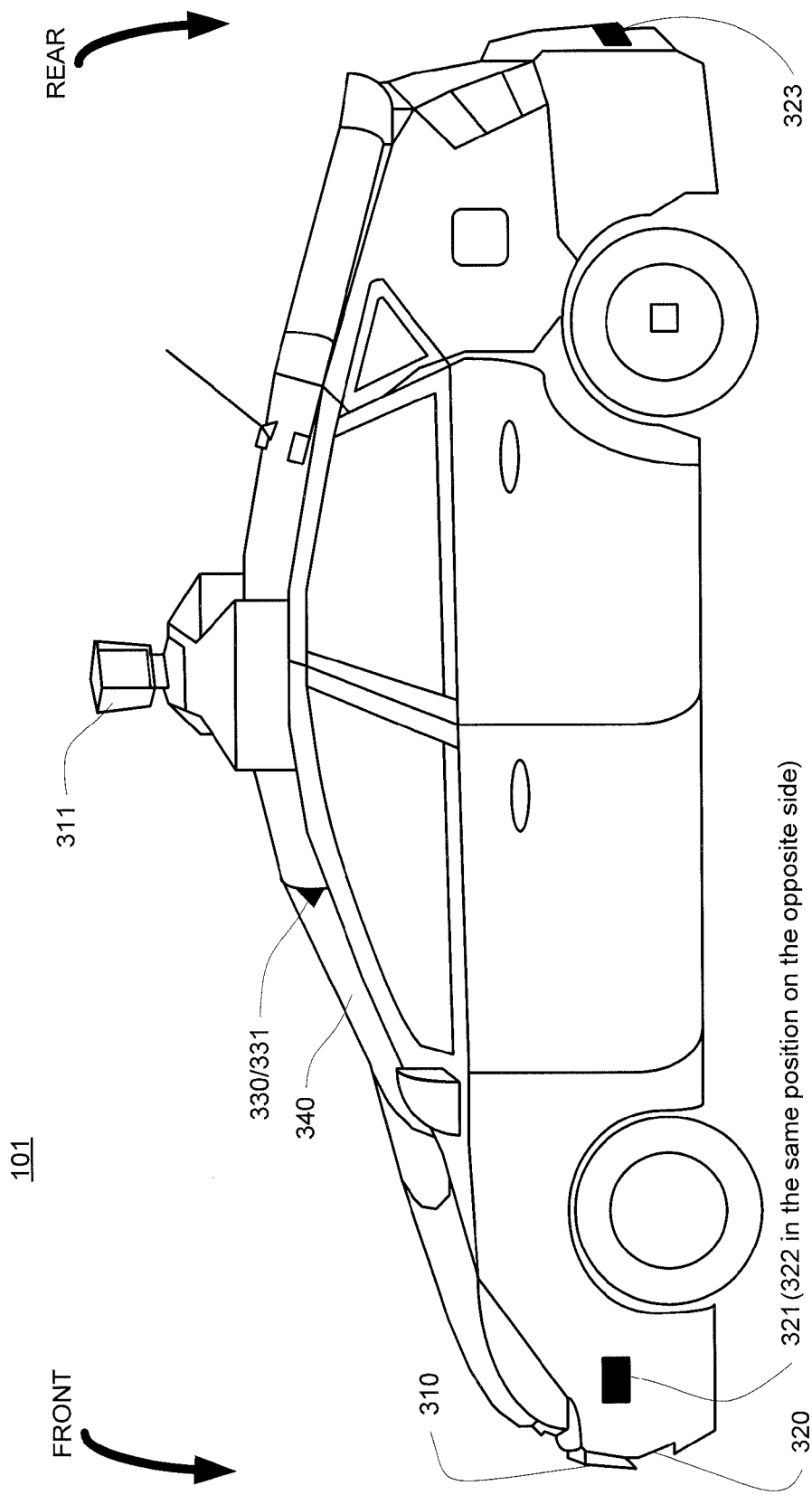
FIG. 3 is a view of the exterior of an exemplary vehicle in accordance with an aspect of the disclosure.

FIG. 3 illustrates a particular embodiment for a small passenger vehicle 301 that includes lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 301 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 301 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

Figure 4A:
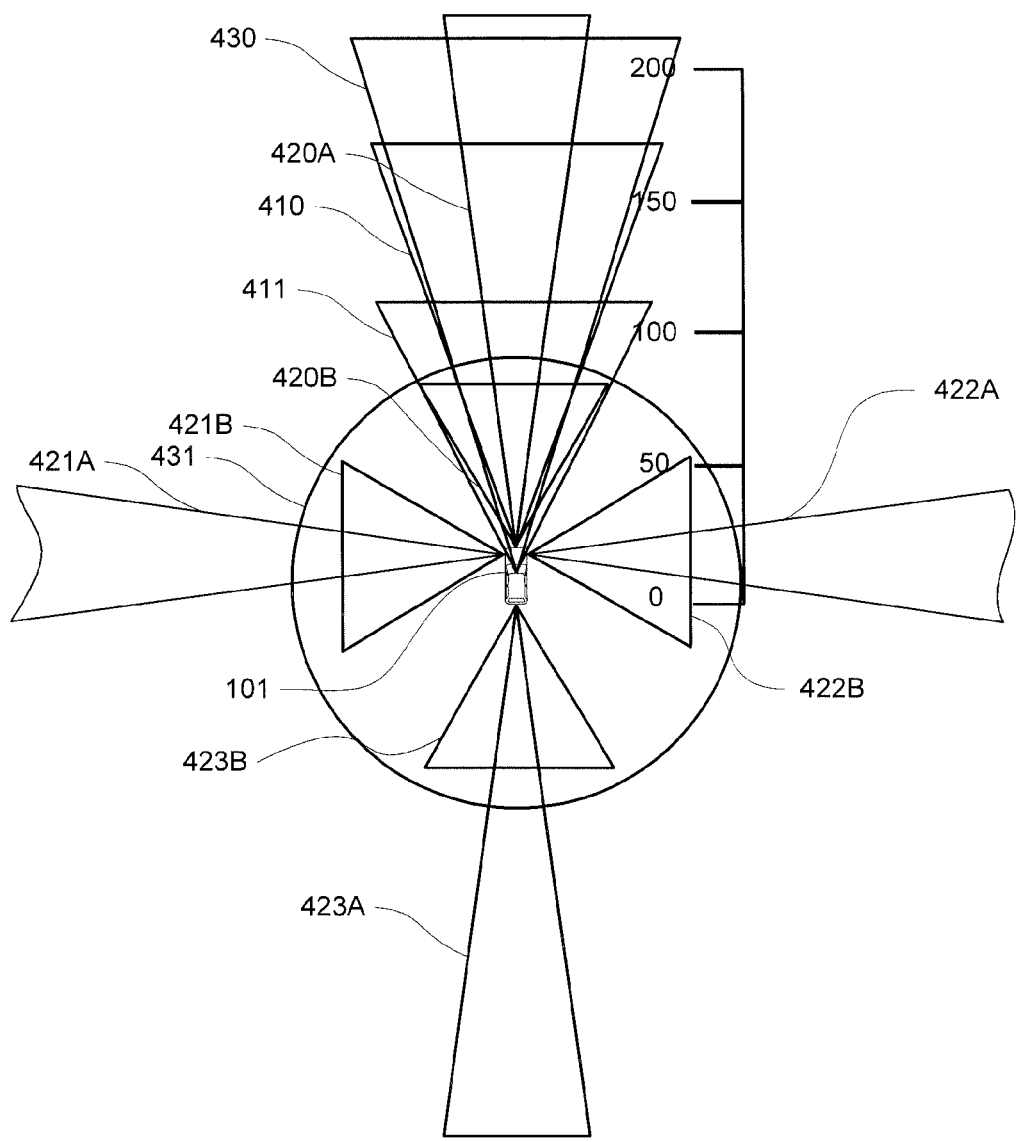
FIGS. 4A-4D are views of the sensor fields for an autonomous vehicle.

Each sensor may be associated with a particular sensor field in which the sensor may be used to detect objects. FIG. 4A is a top-down view of the approximate sensor fields of the various sensors. FIG. 4B depicts the approximate sensor fields 410 and 411 for lasers 310 and 311, respectively based on the fields of view for these sensors. For example, sensor field 410 includes an approximately 30 degree horizontal field of view for approximately 150 meters, and sensor field 411 includes a 360 degree horizontal field of view for approximately 80 meters.

Figure 4C:
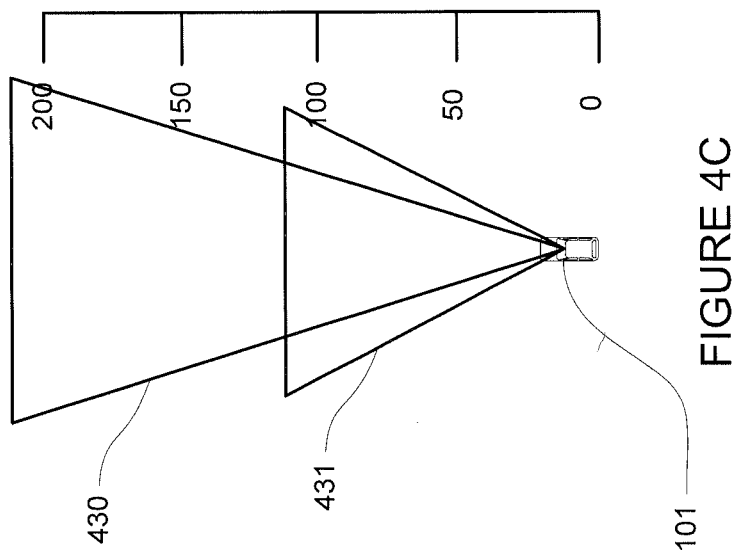
Figure 4B:
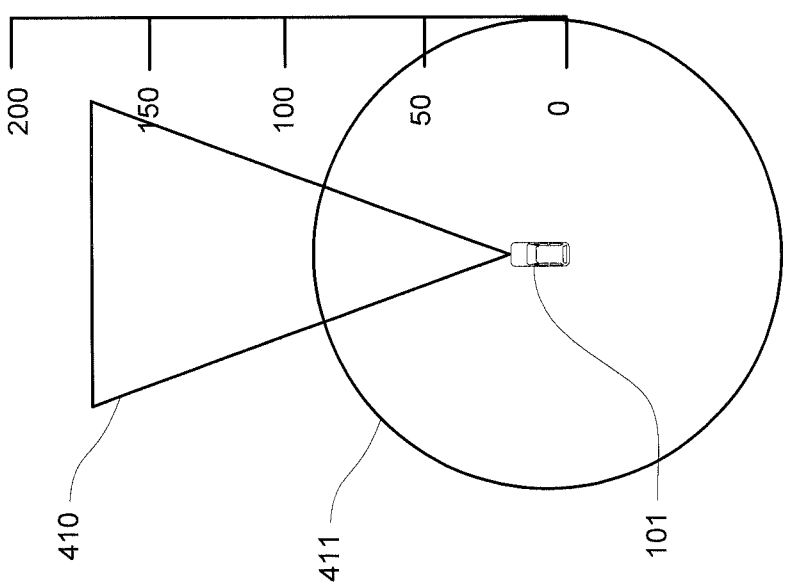
Figure 4D:
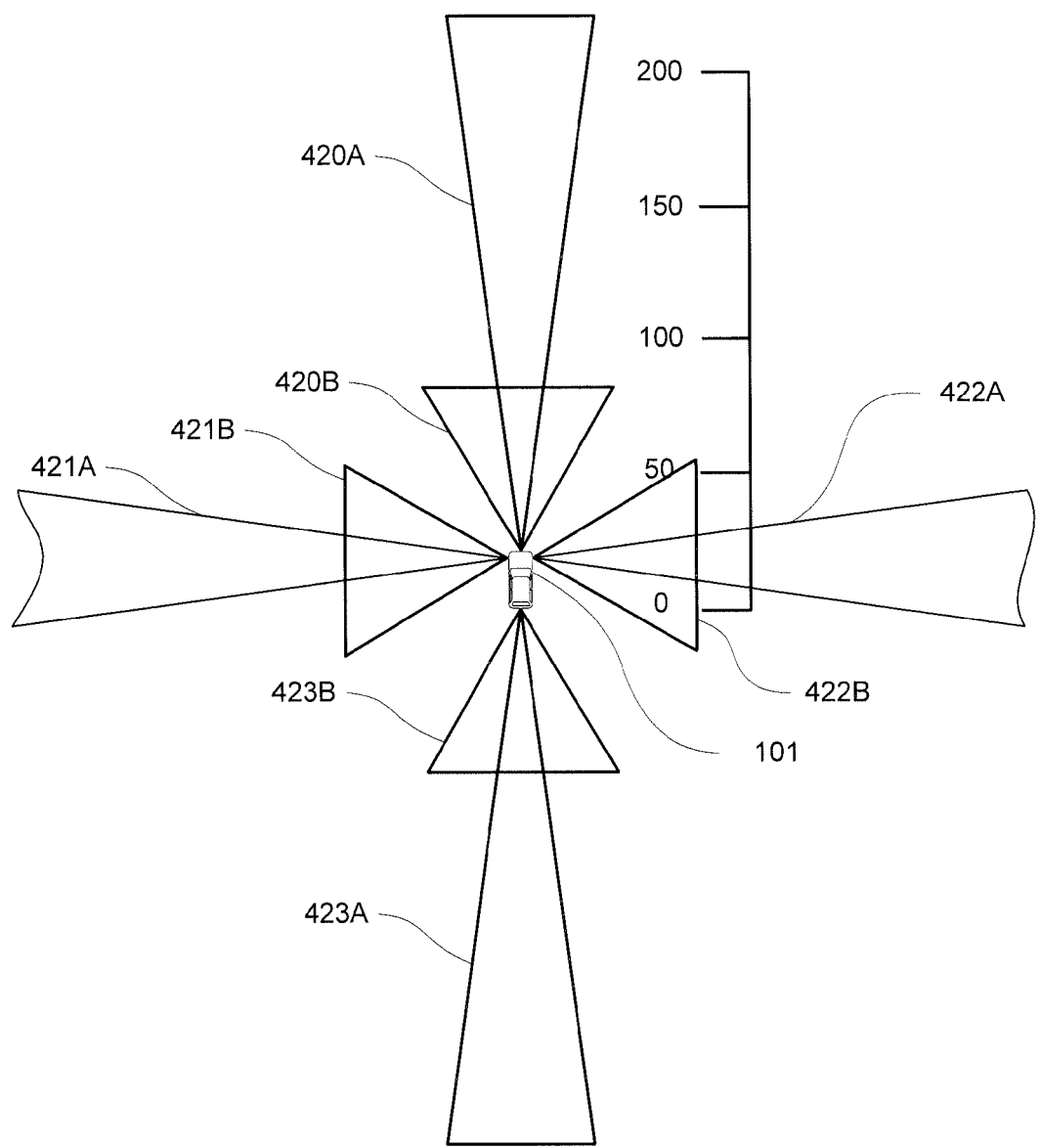

FIG. 4D depicts the approximate sensor fields 420A-423B and for radar detection units 320-323, respectively, based on the fields of view for these sensors. For example, radar detection unit 320 includes sensor fields 420A and 420B. Sensor field 420A includes an approximately 18 degree horizontal field of view for approximately 200 meters, and sensor field 420B includes an approximately 56 degree horizontal field of view for approximately 80 meters. Similarly, radar detection units 321-323 include sensor fields 421A-423A and 421B-423B. Sensor fields 421A-423A include an approximately 18 degree horizontal field of view for approximately 200 meters, and sensor fields 421B-423B include an approximately 56 degree horizontal field of view for approximately 80 meters. Sensor fields 421A and 422A extend passed the edge of FIGS. 4A and 4D.

FIG. 4C depicts the approximate sensor fields 430-431 cameras 330-331, respectively, based on the fields of view for these sensors. For example, sensor field 430 of camera 330 includes a field of view of approximately 30 degrees for approximately 200 meters, and sensor field 431 of camera 430 includes a field of view of approximately 60 degrees for approximately 100 meters.

In another example, an autonomous vehicle may include sonar devices, stereo cameras, a localization camera, a laser, and a radar detection unit each with different fields of view. The sonar may have a horizontal field of view of approximately 60 degrees for a maximum distance of approximately 6 meters. The stereo cameras may have an overlapping region with a horizontal field of view of approximately 50 degrees, a vertical field of view of approximately 10 degrees, and a maximum distance of approximately 30 meters. The localization camera may have a horizontal field of view of approximately 75 degrees, a vertical field of view of approximately 90 degrees and a maximum distance of approximately 10 meters. The laser may have a horizontal field of view of approximately 360 degrees, a vertical field of view of approximately 30 degrees, and a maximum distance of 100 meters. The radar may have a horizontal field of view of 60 degrees for the near beam, 30 degrees for the far beam, and a maximum distance of 200 meters.

The sensors described may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector) or by the computer 110 based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Yet further, if the computer determines that an object is obstructing the intended path of the vehicle, it may maneuver the vehicle around the obstruction.

Figure 5:
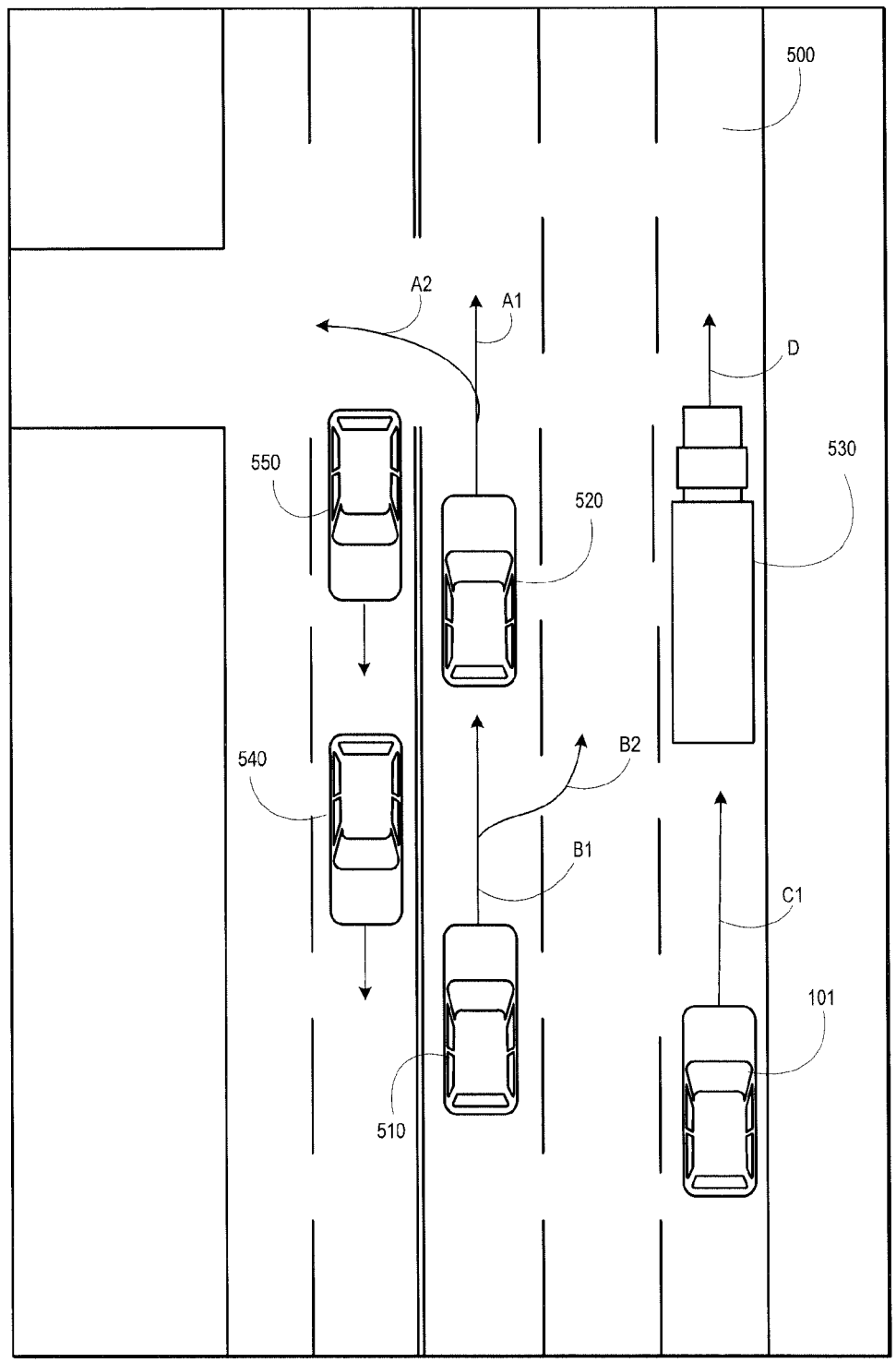
FIG. 5 is a view of an autonomous vehicle traveling autonomously in proximity to other vehicles.

In accordance with one aspect, the autonomous vehicle's computer system 110 may identify when another detected vehicle has performed a particular action of interest. FIG. 5 illustrates an example of vehicle 101 detecting surrounding objects. Using the sensors described above, autonomous vehicle 101 is capable of detecting surrounding vehicles 510-550. As indicated by directional arrows A1, B1, C, and D, vehicle 510 and vehicle 520 are currently traveling along the center lane, while autonomous vehicle 101 and vehicle 530 are traveling north in the right-hand lane. Upon detecting the surrounding vehicles, computer system 110 may track and record the position and movement (e.g. velocity, heading, and acceleration) of each surrounding vehicle.

The position and movement data for the detected vehicles 510-550 may be stored in database 137 of the autonomous driving computer system, as shown in FIG. 1. The autonomous vehicle may then use this data to maneuver vehicle 101 in a way that avoids collisions with nearby vehicles. In accordance with one embodiment, computer system 110 may filter the position and movement data, so as to identify a vehicle's position and movement during particular actions of interest.

For example, database 138 may include a set of actions or behaviors of interest, such as the vehicle changing lanes or routes, and instructions 132 may allow for computer system 110 to identify when a detected vehicle has performed one or more of the behaviors of interest. In particular, computer system 110 may access the recorded position and movement stored in database 137, as well as a road graph of the environment stored in database 136. By combining both sets of data, computer system 110, may then determine when one or more of the key behaviors have occurred.

Returning to FIG. 5, vehicle 101 may record the position and movement data of vehicle 510 and vehicle 520. In doing so, vehicle 101 can detect that vehicle 520 has de-accelerated and is changing its heading in the direction of arrow A2. Similarly, vehicle 101 detects that vehicle 510 has changed its heading as provided by arrow B2. Vehicle 101 may then access stored road graph data that represents vehicle the current environment of vehicles 510 and 520, such as road graph 600 illustrated in FIG. 6. Based on the position and movement of vehicles 510 and 520, relative to vehicle 101, the computer system of vehicle 101 may associate vehicles 510 and 520 with the center lane of City Highway. The computer system of vehicle 101 may then compare the changed heading of vehicle 520 with the stored road graph to determine that vehicle 520 is turning from City Highway to Through Street, at point 610. Likewise, the computer system compares the change in heading of vehicle 510 with map 600 to determine that the vehicle has changed from the center lane to the adjacent lane to the right, at point 620.

Figure 6:
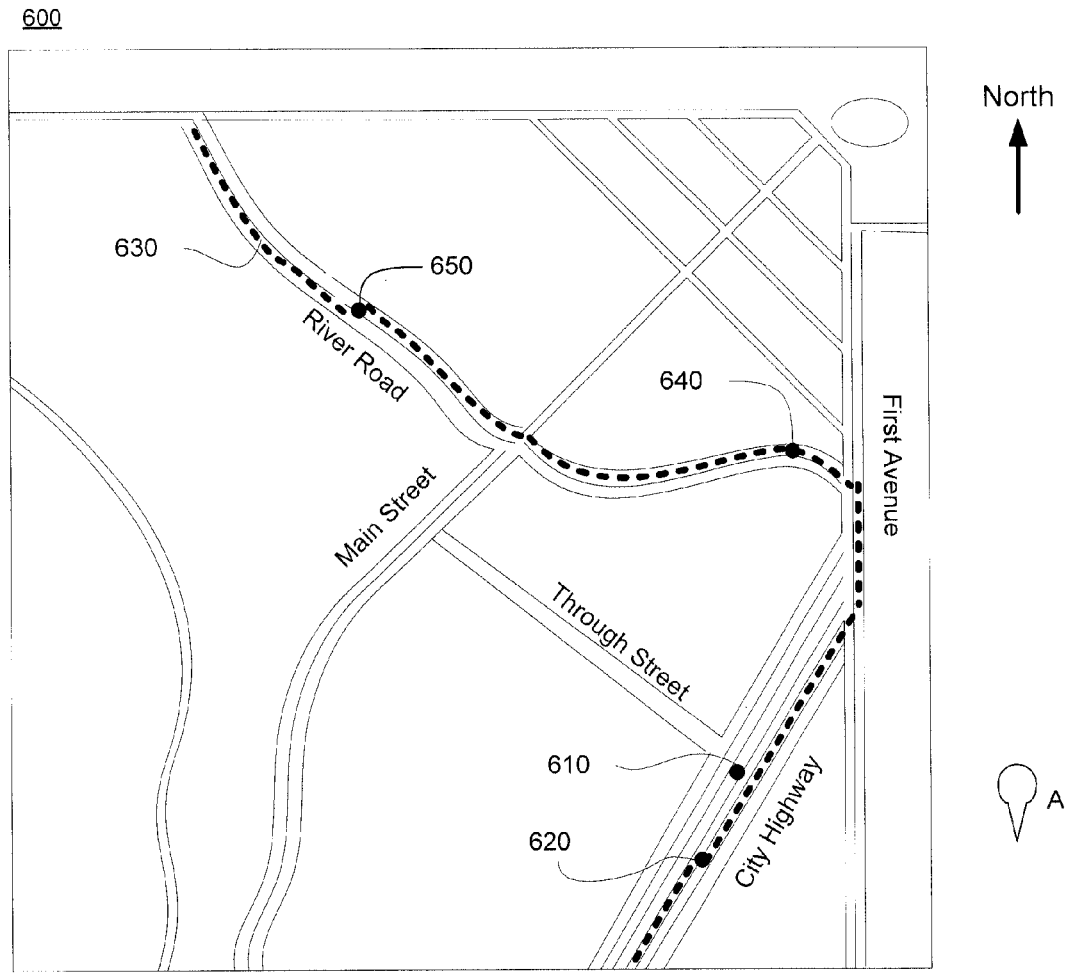
FIG. 6 is a map image in accordance with an aspect of the disclosure.

In this way, vehicle 101 may associate and track all surrounding vehicles with a particular road graph element, such as a lane of travel or intersection. For example, dashed line 630 in FIG. 6 represents the path of travel of vehicle 510. Provided that vehicle 510 remains within an area that can be detected by vehicle 101, this path may be recorded by vehicle 101's computer system. By combining the vehicle's movement data with map 600, vehicle 101 identifies instances along vehicle 510's path where it has performed one or more behaviors of interest. For example, the computer system of vehicle 101 may identify any change in road element as a behavior of interest, such as vehicle 510 traveling from City Highway, to First Avenue, and then to River Road. In addition, vehicle 101 may identify when vehicle 510 has changed lanes on a particular roadway, such as at points 620 and 650.

Vehicle 101 may also filter the data collected for vehicle 510 so that it only contains instances where vehicle 510 has performed an action of interest. As provided by dotted line 630 on map 600, vehicle 510 changes it's heading around point 640, as it begins to travel from a north-west direction to a more south-west direction. While vehicle 101 will collect data regarding vehicle 510's change in heading, computer 110 will also determine that the change in heading does not correspond to an action of interest, as vehicle 510 merely travels along the same road graph element. Vehicle 101 may, in turn, exclude the data corresponding to vehicle 510's change in heading at point 640 as being recorded as an action of interest.

In another embodiment, autonomous vehicle 101 may transport itself, passengers, and/or cargo between two locations by following a route. For example, a driver may input a destination and activate an autonomous mode of the vehicle. In response, the vehicle's computer 110 may calculate a route using a map, its current location, and the destination. Based on the route (or as part of the route generation), the vehicle may determine a control strategy for controlling the vehicle along the route to the destination. In accordance with one embodiment, computer system 110 may control the autonomous vehicle 101 to take particular actions in response to the actions of the surrounding objects that have been identified as performing a behavior of interest. For example, by changing lanes as provided by arrow B2 of FIG. 5, vehicle 101 may identify that vehicle 510 has performed a behavior of interest and thereby reevaluate the current control strategy of vehicle 101. Specifically, computer system 110 may determine that vehicle 101 should decelerate in order to avoid travelling in vehicle 510's blind-spot, given that vehicle 510 is now travelling in the adjacent lane.

As another example, vehicle 520 may come to a stop for a period of time before making the left-hand turn designated by arrow A2. Computer system 110 may identify this action as a behavior of interest, depending on which road element vehicle 520 is travelling. Specifically, if vehicle 520 is determined to be in a left-hand turn lane, vehicle 101 may not identify vehicle 520 having stopped will not as a behavior of interest. However, if vehicle 520 was travelling one lane over to the right, the fact that it has stopped could indicate that there is a backup ahead. Accordingly, vehicle 101 may adjust its control strategy based on which road graph element (e.g., lane) a vehicle is currently travelling.

Figure 7:
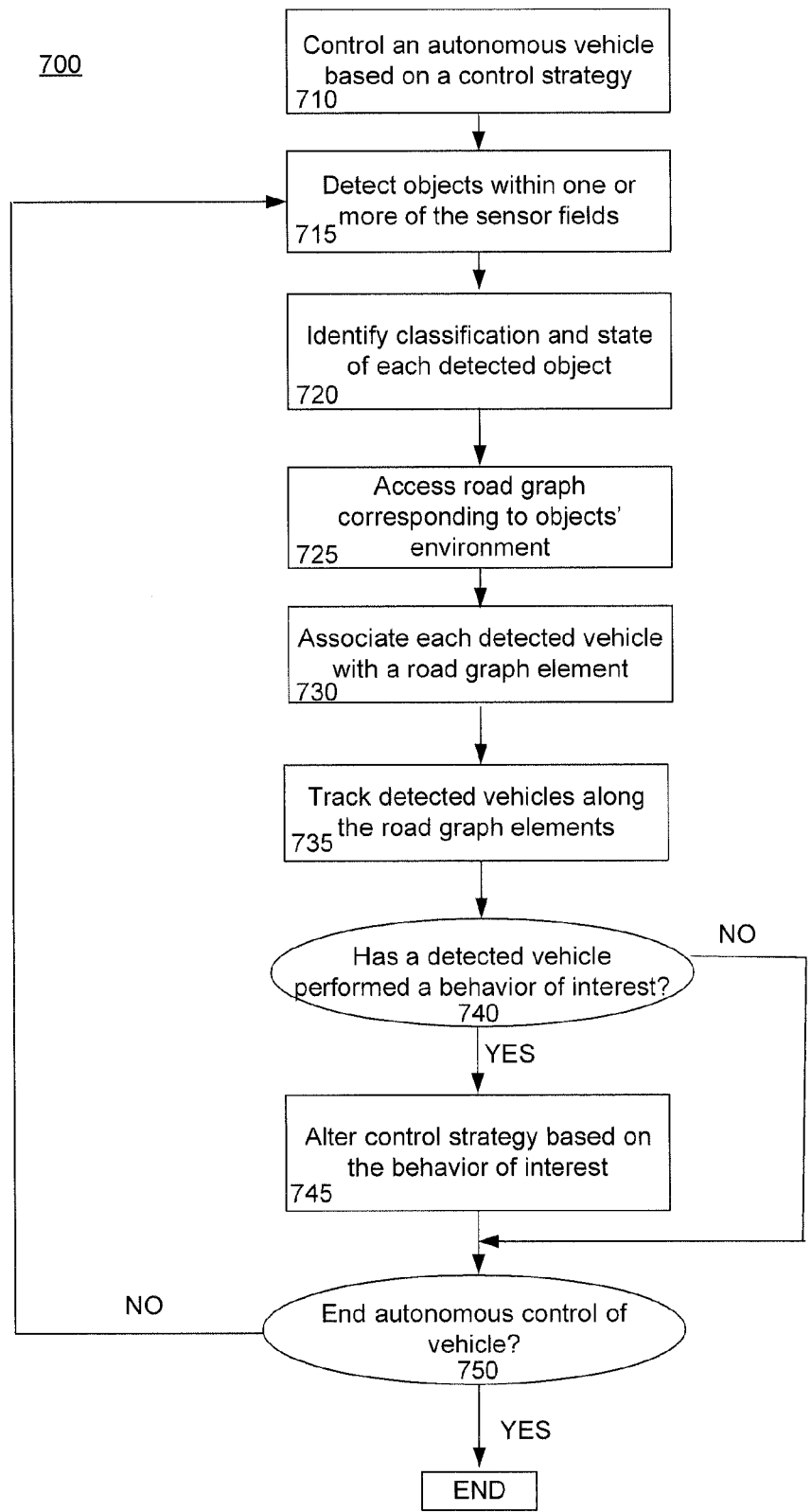
FIG. 7 is a flow chart in accordance with an aspect of the disclosure.

Flow diagram 700 of FIG. 7 provides an example by which vehicle 101 may be autonomously controlled in response to determined behaviors of interest. As provided in Block 710, vehicle 101 implements the determined control strategy by traveling along a determined route. While traveling in accordance with the control strategy, vehicle 101 detects the presence of numerous objects within one or more of the vehicle's sensor fields (Block 715). Upon detecting the objects, the computer 110 may classify the object based on the data received by vehicle 101's sensors (Block 720). For example, the sensor data could be used to classify objects as being a pedestrian, bicycle, or vehicle. As described above, the vehicle's computer 110 also uses the sensor data to determine the object's current state, such as speed, heading, and acceleration. Upon determining the objects classification and current state, computer 110 may then access map data associated with the detected objects' environment (Block 725).

For each vehicle that has been detected, it may be determined whether the vehicle can be associated with a particular road graph element (e.g., a road, lane of traffic, intersection, or other map element) contained in the map data (Block 730). For example, based on a detected vehicle's state information, computer 110 may determine that the detected vehicle is travelling within a particular lane of traffic represented in the road graph. Computer 110 may then track the detected vehicles as they travel along the associated road graph element, (Block 735) and may determine when one of the detected vehicles has performed a behavior of interest (Block 740). Based on determining that a detected vehicle has performed an action of interest, such as a lane change, computer 110 may then alter the control strategy of autonomous vehicle 101 (Block 745). Blocks 715 through 745 may then be repeated until autonomous vehicle 101 has reached its destination or the autonomous control has otherwise terminated (Block 750). In this way, vehicle 101 may further alter the control strategy upon any of the detected vehicles performing an action of interest.

Vehicle 101 may include one or more user input devices that enable a user to provide information to the autonomous driving computer 110. For example, a user, such as a passenger, may input a destination (e.g., 123 Oak Street) into the navigation system using touch screen 217 or button inputs 219. In another example, a user may input a destination by identifying the destination. In that regard, the computer system may extract the destination from a user's spoken command.

The various systems described above may be used by the computer to operate the vehicle and maneuver from one location to another. For example, a user may enter destination information into the navigation system, either manually or audibly. The vehicle may determine its location to a few inches based on a combination of the GPS receiver data, the sensor data, as well as the detailed map information. In response, the navigation system may generate a route between the present location of the vehicle and the destination.

When the driver is ready to relinquish some level of control to the autonomous driving computer, the user may activate the computer. The computer may be activated, for example, by pressing a button or by manipulating a lever such as gear shifter 220. Rather than taking control immediately, the computer may scan the surroundings and determine whether there are any obstacles or objects in the immediate vicinity which may prohibit or reduce the ability of the vehicle to avoid a collision. In this regard, the computer may require that the driver continue controlling the vehicle manually or with some level of control (such as the steering or acceleration) before entering into a fully autonomous mode.

Once the vehicle is able to maneuver safely without the assistance of the driver, the vehicle may become fully autonomous and continue to the destination. The driver may continue to assist the vehicle by controlling, for example, steering or whether the vehicle changes lanes, or the driver may take control of the vehicle immediately in the event of an emergency.

The vehicle may continuously use the sensor data to identify objects, such as traffic signals, people, other vehicles, and other objects, in order to maneuver the vehicle to the destination and reduce the likelihood of a collision. The vehicle may use the map data to determine where traffic signals or other objects should appear and take actions, for example, by signaling turns or changing lanes. Once the vehicle has arrived at the destination, the vehicle may provide audible or visual cues to the driver. For example, by displaying "You have arrived" on one or more of the electronic displays.

The vehicle may be only partially autonomous. For example, the driver may select to control one or more of the following: steering, acceleration, braking, and emergency braking.

The vehicle may also have one or more user interfaces that allow the driver to reflect the driver's driving a style. For example, the vehicle may include a dial which controls the level of risk or aggressiveness with which a driver would like the computer to use when controlling the vehicle. For example, a more aggressive driver may want to change lanes more often to pass cars, drive in the left lane on a highway, maneuver the vehicle closer to the surrounding vehicles, and drive faster than less aggressive drivers. A less aggressive driver may prefer for the vehicle to take more conservative actions, such as somewhat at or below the speed limit, avoiding congested highways, or avoiding populated areas in order to increase the level of safety. By manipulating the dial, the thresholds used by the computer to calculate whether to pass another car, drive closer to other vehicles, increase speed and the like may change. In other words, changing the dial may affect a number of different settings used by the computer during its decision making processes. A driver may also be permitted, via the user interface 225, to change individual settings that relate to the driver's preferences. In one embodiment, insurance rates for the driver or vehicle may be based on the style of the driving selected by the driver.

Aggressiveness settings may also be modified to reflect the type of vehicle and its passengers and cargo. For example, if an autonomous truck is transporting dangerous cargo (e.g., chemicals or flammable liquids), its aggressiveness settings may be less aggressive than a car carrying a single driver—even if the aggressive dials of both such a truck and car are set to "high." Moreover, trucks traveling across long distances over narrow, unpaved, rugged or icy terrain or vehicles may be placed in a more conservative mode in order reduce the likelihood of a collision or other incident.

In another example, the vehicle may include sport and non-sport modes which the user may select or deselect in order to change the aggressiveness of the ride. By way of example, while in "sport mode", the vehicle may navigate through turns at the maximum speed that is safe, whereas in "non-sport mode", the vehicle may navigate through turns at the maximum speed which results in g-forces that are relatively imperceptible by the passengers in the car.

The vehicle's characteristics may also be adjusted based on whether the driver or the computer is in control of the vehicle. For example, when a person is driving manually the suspension may be made fairly stiff so that the person may "feel" the road and thus drive more responsively or comfortably, while, when the computer is driving, the suspension may be made such softer so as to save energy and make for a more comfortable ride for passengers.

Figure 8:
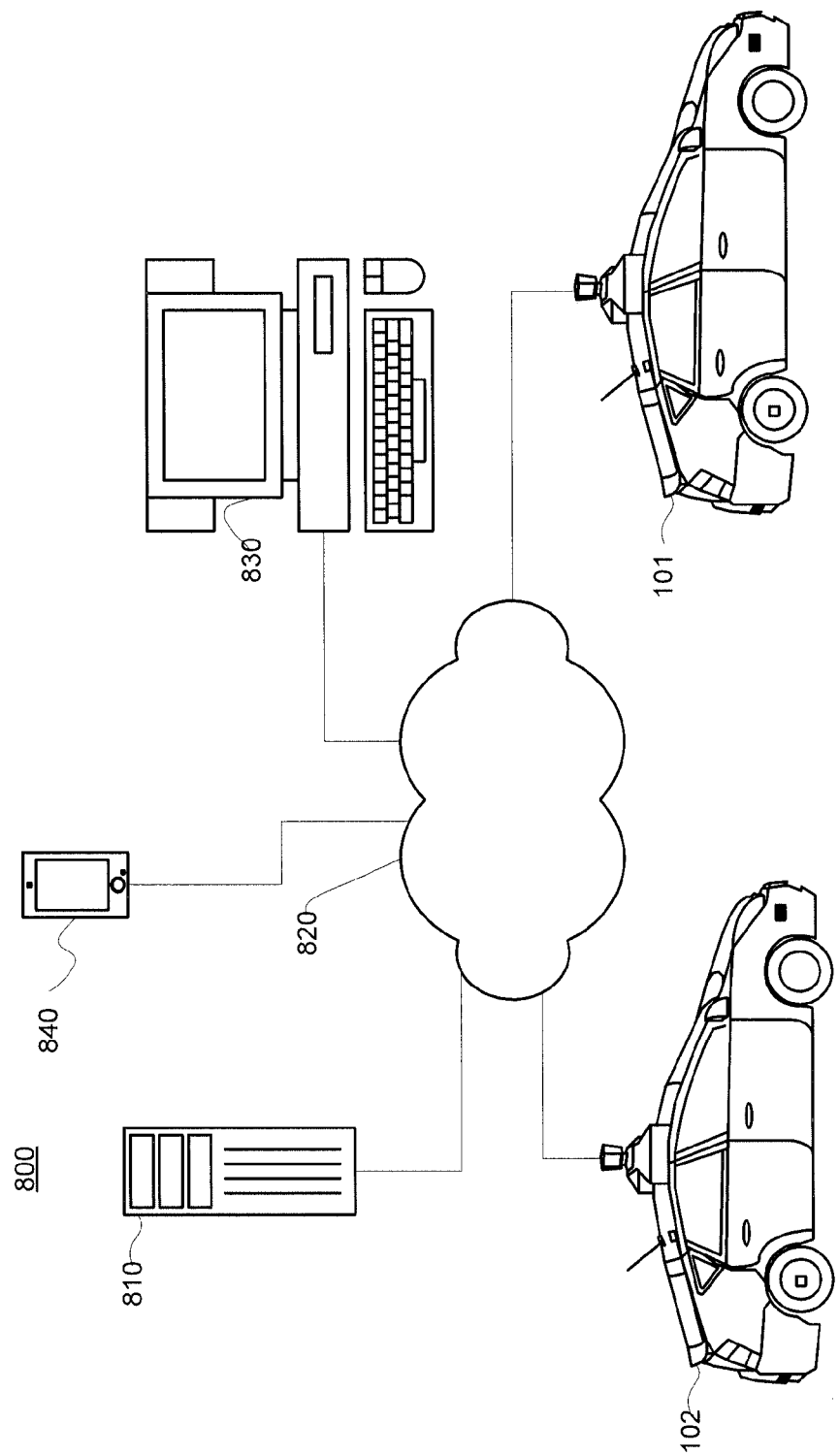
FIG. 8 is a functional diagram of a communication system in accordance with an aspect of the disclosure.

The driver may also select to have his or her vehicle communicate with other devices. As shown in FIG. 8, vehicle 101 may communicate over a network 820 with devices such as a remote server 810, a personal computer 830, a mobile device 840, or another autonomous vehicle 802. In addition, vehicles, such as vehicle 101 and vehicle 102, may wirelessly transmit information directly to nearby vehicles using radio, cellular, optical or other wireless signals. Alternatively, vehicles may communicate with each via nodes that are shared among multiple vehicles, e.g., by using cell towers to call other cars or transmit and send information to other cars via the Internet. The transmitted information between vehicles may include data describing the vehicle or the vehicle's environment. For example, upon determine that a detected vehicle has performed a behavior of interest, vehicle 101 may transmit data to remote server 810 that identifies the detected vehicle and it state (e.g., position, speed, acceleration, and heading). Remote Server 810 may then record the data provided by vehicle 101 regarding detected behaviors of interest.

Vehicle 101 may also receive updated map or object data via network 820. For example, server 810 may provide vehicle 101 with new data relating to object classifications and behavior model information. Computer system 110, of FIG. 1, may then be updated, and the new data may be used in controlling the vehicle autonomously, such as through implementation of flow diagram 700.

As these number and usage of these autonomous vehicles increases, various sensors and features may be incorporated into the environment to increase the perception of the vehicle. For example, low-cost beacon transmitters may be placed on road signs, traffic signals, roads or other highway infrastructure components in order to improve the computer's ability to recognize these objects, their meaning, and state. Similarly, these features may also be used to provide additional information to the vehicle and driver such as, whether the driver is approaching a school or construction zone. In another example, magnets, RFID tags or other such items may be placed in the roadway to delineate the location of lanes, to identify the ground speed vehicle, or increase the accuracy of the computer's location determination of the vehicle.

Autonomous vehicles may also be controlled remotely. For example, if the driver is asleep, the sensor data may be sent to a third party so that vehicle may continue to have a responsive operator. While delay and latency may make this type of telemetry driving difficult, it may for example be used in emergency situations or where the vehicle has gotten itself stuck. The vehicle may send data and images to a central office and allow a third party to remotely drive the vehicle for a short period until the emergency has passed or the vehicle is no longer stuck.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method comprising:
controlling, by one or more computing devices, an autonomous vehicle in accordance with a first control strategy;
receiving, by the one or more computing devices, sensor data indicating a detection of a first object;
classifying, by the one or more computing devices, the first object based on the sensor data;
accessing, by the one or more computing devices, behavior data based on a classification of the first object, wherein the behavior data identifies potential actions of the first object that are to result in a change in control strategy, and wherein at least one of the potential actions identified in the behavior data is the action of changing from traveling on a first road element to travelling on a second road element;
determining, by the one or more computing devices, that the first object has performed an action identified in the behavior data; and
based on the determination, altering the control strategy of the autonomous vehicle by the one or more computing devices.

2. The method of claim 1, wherein the first road element is a first lane of traffic on a roadway, and wherein the second road element is a second lane of traffic on the roadway.

3. The method of claim 1, wherein altering the control strategy of the autonomous vehicle comprises positioning the autonomous vehicle relative to the first object in a predefined manner.

4. The method of claim 1, wherein altering the control strategy of the autonomous vehicle comprises having the autonomous vehicle change from travelling in a first lance of traffic to travelling in a second lane of traffic.

5. The method of claim 1, wherein altering the control strategy of the autonomous vehicle comprises altering at least one of a position, heading, speed, and acceleration of the autonomous vehicle.

6. The method of claim 1, wherein the first object is classified as a vehicle.

7. The method of claim 6, wherein determining that the first object has performed an action identified in the behavior data further comprises determining that the first object has changed from travelling on the first road element to travelling on the second road element.

8. A method comprising:
controlling, by one or more computing devices, an autonomous vehicle;
receiving, by the one or more computing devices, sensor data indicating a position of a first object external to the autonomous vehicle;
classifying, by the one or more computing devices, the first object based on the sensor data;
accessing, by the one or more computing devices, map data having a plurality of road elements;
comparing the sensor data with the map data;
identifying, by the one or more computing devices, that the first object is travelling on a first road element from the plurality of road elements;
determining, by the one or more computing devices, that based on the comparison of the sensor data with the map data, the first object has travelled from the first road element to a second road element; and
altering, by the one or more computing devices, at least one of a position, heading, speed, and acceleration of the autonomous vehicle based on the determination that the first object has travelled from the first road element to the second road element.

9. The method of claim 8, wherein the first road element is a first lane of traffic on a roadway, and wherein the second road element is a second lane of traffic on the roadway.

10. The method of claim 8, wherein altering at least one of the position, heading, speed, and acceleration of the autonomous vehicle comprises positioning the autonomous vehicle relative to the first object in a predefined manner.

11. The method of claim 8, further comprising:
   receiving, by the one or more computing devices, a request to navigate between a first location and a second location; and
   autonomously navigating, by the one or more computing devices, the autonomous vehicle along a path between the first location and a second location; and
   wherein altering at least one of a position, heading, and speed of the autonomous vehicle, occurs while the autonomous vehicle is travelling along the path.

12. The method of claim 8, further comprising:
   determining a relative position of the autonomous vehicle with each of the one or more nearby vehicles, and
   wherein associating each of the one or more nearby vehicles with a road graph element is based on the relative position.

13. A system for controlling an autonomous vehicle, the system comprising:
   one or more sensors for detecting a one or more vehicles in an autonomous vehicle's surroundings; and
   one or more processors configured to:
   control an autonomous vehicle in accordance with a first control strategy;
   receive sensor data indicating a detection of a first object;
   classify the first object based on the sensor data;
   access behavior data based on a classification of the first object, wherein the behavior data identifies potential actions of the first object that are to result in a change in control strategy, and wherein at least one of the potential actions of the first object is the first object changing from traveling on a first road element to travelling on a second road element;
   determine that the first object has performed an action identified in the behavior data; and
   alter the control strategy of the autonomous vehicle based on the determination.

14. The system of claim 13, wherein the first road element is a first lane of traffic on a roadway, and wherein the second road element is a second lane of traffic on the roadway.

15. The system of claim 13, wherein altering the control strategy of the autonomous vehicle comprises positioning the autonomous vehicle relative to the first object in a predefined manner.

16. The system of claim 13, wherein altering the control strategy of the autonomous vehicle comprises having the autonomous vehicle change from travelling in a first lance of traffic to travelling in a second lane of traffic.

17. The system of claim 13, wherein altering the control strategy of the autonomous vehicle comprises altering at least one of a position, heading, speed, and acceleration of the autonomous vehicle.

18. The system of claim 13, wherein the sensor data includes information relating to at least one of a position, heading, speed, and acceleration of the first object.

19. The system of claim 18, wherein determining that the first object has performed an action identified in the behavior data further comprises determining that the first object has changed from travelling on the first road element to travelling on the second road element.

20. The system of claim 13, wherein the one or more processors are further configured to:
   receive a request for navigation between a first location and a second location; and
   autonomously navigate the autonomous vehicle along a path between the first location and a second location; and
   wherein altering the control strategy occurs while the autonomous vehicle travels along the path.

* * * * *